United States Patent [19]
Oliveri et al.

[11] Patent Number: 5,959,020
[45] Date of Patent: Sep. 28, 1999

[54] ULTRAVIOLET RADIATION CURABLE COMPOSITIONS

[75] Inventors: Michael R. Oliveri, North Caldwell; Manshi Sui, Somerville; Joseph Coffey, Nutley, all of N.J.

[73] Assignee: Shamrock Technologies, Inc., Newark, N.J.

[21] Appl. No.: 08/906,707

[22] Filed: Aug. 6, 1997

[51] Int. Cl.⁶ ..................................................... C08K 5/01
[52] U.S. Cl. ............................... 524/487; 522/63; 522/79
[58] Field of Search .......................... 522/63, 79; 524/487

[56] References Cited

U.S. PATENT DOCUMENTS

| | | | |
|---|---|---|---|
| 4,218,294 | 8/1980 | Brack | 522/46 |
| 4,303,696 | 12/1981 | Brack | 522/79 |
| 5,085,697 | 2/1992 | Kimura | 522/43 |
| 5,380,772 | 1/1995 | Hasegawa | 522/14 |
| 5,491,178 | 2/1996 | Swedo | 522/75 |
| 5,629,359 | 5/1997 | Peeters et al. | 522/96 |
| 5,723,511 | 3/1998 | Kazmaier | 522/62 |
| 5,728,747 | 3/1998 | Kazmaier | 522/63 |

*Primary Examiner*—Paul R. Michl
*Attorney, Agent, or Firm*—Baker & Botts, L.L.P.

[57] ABSTRACT

The present invention provides ultraviolet radiation (UV)-curable compositions and a method for making a UV-curable composition comprising: mixing at least one wax, at least one radiation-polymerizable compound, and at least one inhibitor of polymerization; dissolving the wax in the radiation-polymerizable compound by heating to provide a mixture of radiation-polymerizable compound, wax and inhibitor; cooling said mixture to provide a dispersion of the wax in the radiation-polymerizable compound; and micronizing the dispersion to provide a UV-curable composition. The invention further provides a method for coating a substrate with a UV-curable coating, and a coating, paint, varnish or ink comprising a UV-curable composition. Manufactured articles formed using the coatings, paints, varnishes and inks comprising a UV-curable composition are also provided.

35 Claims, 3 Drawing Sheets

ULTRAVIOLET RADIATION CURABLE COMPOSITIONS

SPECIFICATION

BACKGROUND OF THE INVENTION

Ultraviolet radiation (UV)-curable compositions are used as printing varnishes, inks, adhesives for laminates, and in the production of coatings, varnishes and paints for the protection and decoration of a variety of substrates. UV-curable compositions offer significant advantages over typical heat curable compositions. For example, the heat curable compositions contain solvents, and therefore film formation by drying results in environmental pollution. In contrast, UV-curable compositions contain a reactive monomer in place of the solvent. Polymerization of the composition results in the formation of a cross-linked film over the substrate, and thus emission problems are eliminated by the UV-curable compositions.

UV-curable compositions also suffer from certain disadvantages. The compositions generally contain a liquid reactive monomer carrier, free radical initiators to initiate cross-linking of the composition upon UV irradiation, and additives suitable for the intended technical application of the composition. Additives are typically dispersed into the liquid monomer carrier by grinding the additives into a fine powder and mixing the powder into the monomer. This process is associated with numerous problems, including the inhalation hazard involved in handling the finely ground dry powder. Further, the dispersions resulting from this process are nonuniform due to the incompatibility of the additives with the monomer. The nonuniform nature of the dispersion may necessitate the use of surfactants, which in turn results in foaming problems. In particular, foaming causes pinholes in the final cured coating.

An additional disadvantage of the typical process for preparing UV-curable compositions is the lack of stability of the resulting dispersions. The suspended solids may fall out of the liquid monomer after only one or two days. To reduce this tendency, the dispersions are often formulated with higher viscosity, but higher viscosity dispersions are less flowable when incorporated into coatings. Yet another disadvantage of the typical dispersions is a reduction in gloss and clarity in finished surfaces incorporating the dispersions for clear coating applications.

Accordingly, there exists a need in the art for improved methods of producing UV-curable compositions. The present invention provides, inter alia, a method for producing UV-curable compositions that avoids the problems associated with fine dry powders and surfactants, and produces a fine, uniform, and stable product.

SUMMARY OF THE INVENTION

The present invention provides a method for making a UV-curable composition comprising: mixing at least one wax, at least one radiation-polymerizable compound, and at least one inhibitor of polymerization; dissolving the wax in the radiation-polymerizable compound by heating to provide a mixture of radiation-polymerizable compound, wax and inhibitor; cooling said mixture to provide a dispersion of the wax in the radiation-polymerizable compound; and micronizing the dispersion to provide a UV-curable composition.

The present invention further provides UV-curable compositions comprising a dispersion of wax particles in at least one radiation-polymerizable compound. In a preferred embodiment, the wax particles have a particle size of less than about ten microns.

In another embodiment, the present invention provides a method for coating a substrate comprising adding a UV-curable composition to a coating to provide a UV-curable coating, wherein the UV-curable composition comprises a dispersion of wax particles in at least one radiation-polymerizable compound; applying the UV-curable coating to a substrate; and exposing the substrate to ultraviolet radiation for a time sufficient to form a cured coating.

The invention also provides a coating, paint, varnish or ink comprising a UV-curable composition wherein the composition comprises a dispersion of wax particles in a radiation-polymerizable compound, and manufactured articles formed using the coatings, paints, varnishes and inks of the invention.

DETAILED DESCRIPTION OF THE INVENTION

Figure 1:
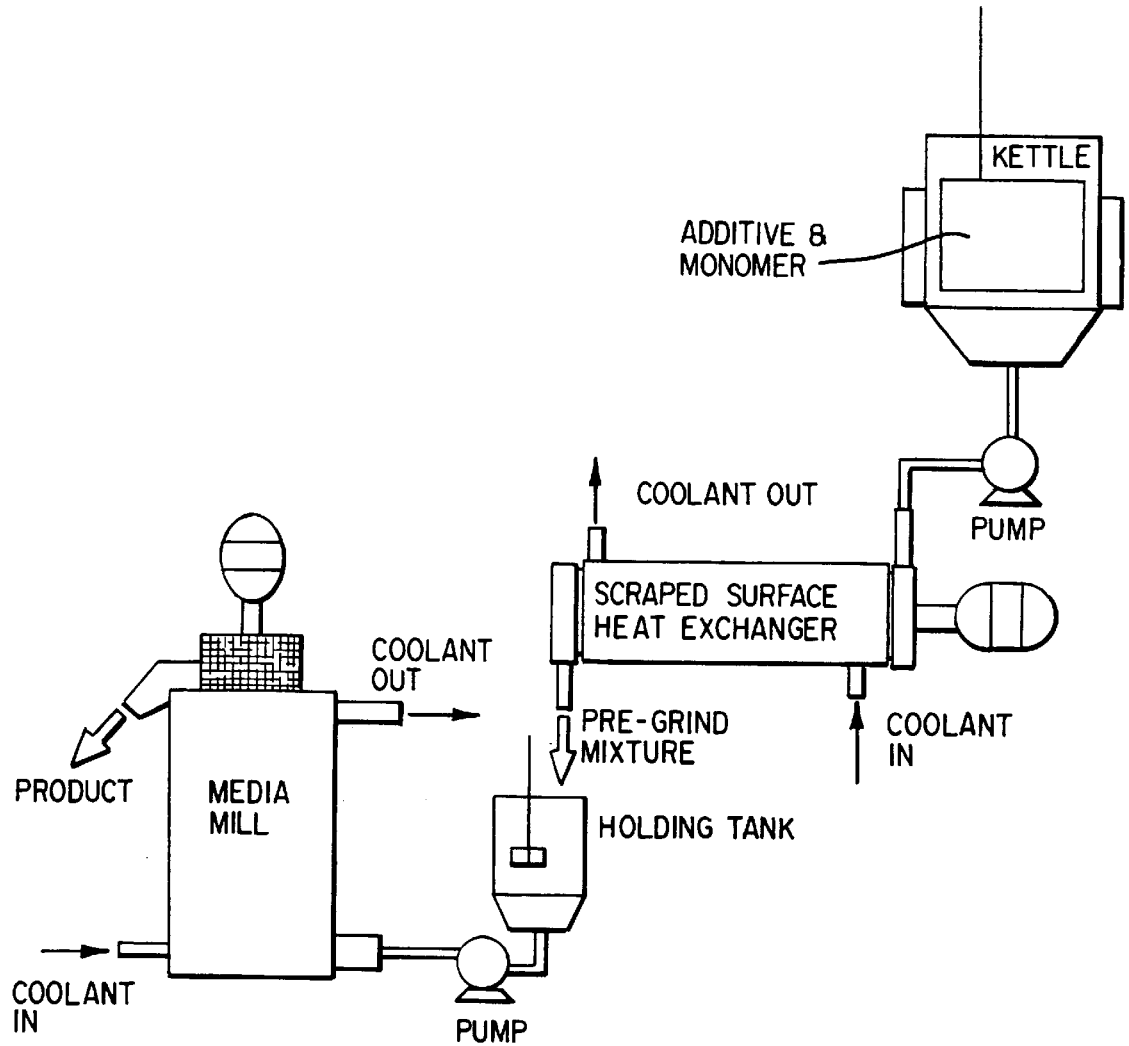
FIG. 1 is a schematic diagram of a process for producing UV-curable compositions.

The present invention provides a method for making a UV-curable composition comprising: mixing at least one wax, at least one radiation-polymerizable compound, and at least one inhibitor of polymerization; dissolving the wax in the radiation-polymerizable compound by heating to provide a mixture of the radiation-polymerizable compound, the wax and the inhibitor; cooling the mixture to provide a dispersion of the wax in the radiation-polymerizable compound; and micronizing the dispersion to provide a UV-curable composition. The present invention further provides UV-curable compositions comprising a dispersion of wax particles in at least one radiation-polymerizable compound.

The method of the present invention provides UV-curable compositions in which the waxes are dispersed in the radiation-polymerizable compound in a extremely fine particle size, preferably of less than about ten microns, and more preferably of from about two to about eight microns. The compositions have a very smooth, creamy texture, are flowable despite high viscosity, and show good stability. For example, the wax does not fall out of the suspension even after a period of about two months.

The waxes used in the method of the present invention may be synthetic or natural waxes. Synthetic waxes include, for example, polyethylene (PE), oxidized PE, polypropylene, Fischer-Tropsch (FT) waxes, ethylene bis-stearamide (EBS), and erucamide. Natural waxes include candelila, carnauba, montan, and petroleum waxes such as the paraffins and the microcrystalline waxes. The waxes are well-known and commercially available. The waxes used to prepare the present compositions need not be in fine powder form, and may be in the form of slabs, pellets, prills, flakes, or coarse powder. Typically prills or pellets range in size from about 500 $\mu$m to about 2 mm. The function of the wax in the present compositions is to provide certain specific properties to the finished coating, such as slip, abrasion-resistance, gloss and hardness. Those of ordinary skill in the art can choose an appropriate wax to impart the desired properties, depending upon the intended use of the composition. In a preferred embodiment of the present invention, the wax is carnauba, PE, oxidized PE, EBS or FT wax, or combinations thereof. Preferred combinations include PE and EBS, and oxidized PE and FT wax.

The radiation-polymerizable compounds of the present invention may be reactive monomers or oligomers. Monomers include mono-, di- and poly-functional acrylates such as polypropylene glycol monomethacrylate, tripropylene glycol diacrylate (TRPGDA), 1,6-hexandiol diacrylate, and triethylene glycol diacrylate. A preferred monomer is TRPGDA. Oligomers include epoxy acrylates and methacrylates, urethane acrylates and methacrylates, polyester acrylates and methacrylates, acrylic acrylates and methacrylates, and cycloaliphatic epoxies. The monomer or oligomer functions as a carrier in the present compositions and finished products. If a monomer is used as the carrier, an oligomer may be added to increase the viscosity of the composition. In the final application to the substrate, the monomer and oligomer function as the cross-linking medium during curing. The monomers and oligomers are well-known in the art and commercially available.

The inhibitors of polymerization used in the method of the present invention function to prevent premature cross-linking of the monomers and oligomers, for example during processing and transportation. Inhibitors of polymerization are well-known to those of ordinary skill in the art and include, for example, quinones such as hydroquinone (HQ) and methyl hydroquinone (MEHQ), aromatic ketones such as benzophenone and phenyl benzophenone, acetophenones such as 2,2-diethoxy acetophenone, 1-hydroxy cyclohexyl acetophenone, and benzoins such as benzoin ethers. Preferred inhibitors are HQ and MEHQ.

In accordance with the method of the present invention, the wax or waxes, the radiation-polymerizable compound or compounds, and the inhibitor or inhibitors of polymerization are mixed in amounts such that the resulting composition contains at least about 5% by weight of the wax or waxes, at least about 0.01% of the inhibitor or inhibitors, and at least about 49% of the radiation-polymerizable compound, which may be a monomer, oligomer, or mixture thereof. In a preferred embodiment, the composition contains from about 5% to about 50% of wax, from about 0.02% to about 0.10% of inhibitor, and from about 49.9% to about 94.98% of radiation-polymerizable compound.

In accordance with the present method, the wax, the radiation-polymerizable compound and the inhibitor are mixed in a suitable vessel, for example a kettle or a heated vessel. The mixture is heated until the wax is dissolved in the radiation-polymerizable compound. Those of ordinary skill in the art can determine suitable temperatures for dissolution, depending upon the particular wax/radiation polymerizable compound combination selected. For example, a temperature of from about 170° F. to about 270° F. may be required to dissolve waxes such as carnauba, oxidized PE, EBS and FT wax in TRPGDA.

For waxes that do not easily dissolve in the radiation polymerizable compound, an additional component, or cosolvent, may be added to facilitate dissolution of the wax. Typical cosolvents include, for example, EBS and erucamide.

The mixture is then cooled to provide a dispersion of the wax in the radiationpolymerizable compound. Cooling may be achieved by pumping the mixture through a wiped-film heat exchanger, also known as a scraped-surface heat exchanger. Scraped-surface heat exchangers are well-known to those of skill in the art and can be obtained commercially.

Figure 2A:
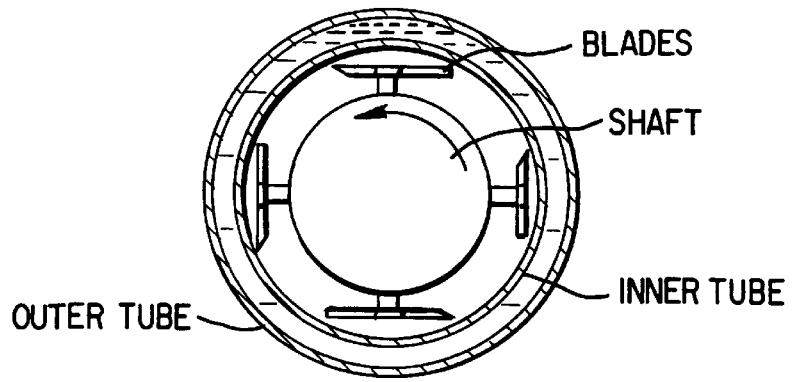
FIG. 2 provides a front and a side view of a scraped-surface heat exchanger.
Figure 2B:
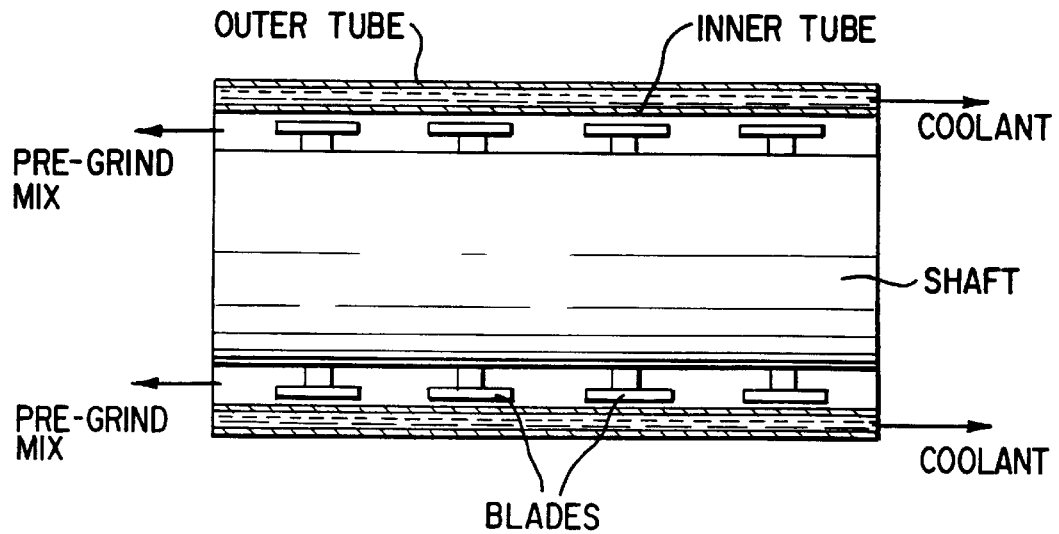

A schematic diagram of a preferred embodiment of the method of the invention is shown in FIG. 1. More detailed views of a typical scraped-surface heat exchanger are depicted in FIG. 2. As shown in FIG. 2, a typical scraped-surface heat exchanger consists of a shaft with blades positioned in the center of the tube, or product chamber. The outer surface of the inner tube is cooled, for example by a water-glycol mixture. In the method of the present invention, the heated mixture of the wax dissolved in the radiation-polymerizable compound is pumped through the scraped-surface heat exchanger. The mixture flows through the annular space between the shaft and inner tube and is cooled when it comes into contact with the tube surface. The cooling causes the wax to crystallize out of the solution, onto the inner surface of the tube, from which it is scraped off by the rotating blades on the shaft. The cooling and scraping provides a dispersion of wax particles in the radiation polymerizable compound, which is designated herein as the pre-grind mixture. The pre-grind mixture is a very viscous, intimate dispersion of the wax particles in the radiation-polymerizable compound. The size of the wax particles the pre-grind mixture is dependent upon the cooling conditions, the flow rate of the solution, and the annular spacing and rotational speed of the shaft. Those of ordinary skill in the art can adjust these conditions in order to produce a pre-grind mixture comprising very fine particles of wax, for example in the size range of about 3 to about 10 microns. The consistency of the pre-grind mixture can range from a viscosity of from about 20,000 cp to about 50 cp, and can be adjusted by the ordinarily skilled artisan by adjusting output conditions. In a preferred embodiment, the pre-grind material has a viscosity of from about 10,000 cp to about 100 cp. At these lower viscosities, the mixture is more flowable. The pre-grind mixture is stable at room temperature. Stability at room temperature is defined herein as exhibiting no separation after about two months. Qualitatively, the pre-grind mixture has a smooth, creamy texture and feel.

Figure 3:
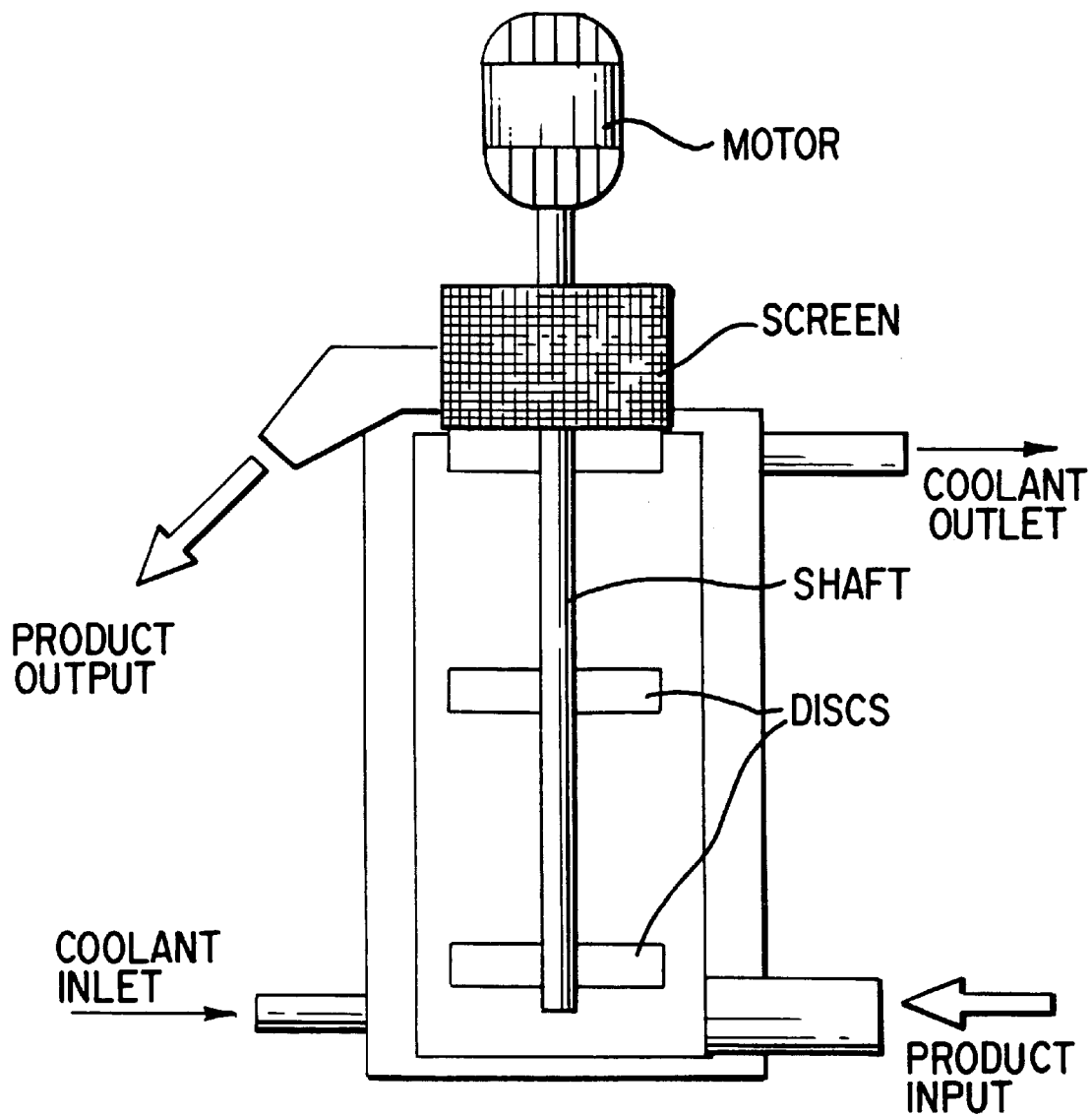
FIG. 3 is a schematic diagram of a vertical continuous flow media mill.

The dispersion, or pre-grind mixture, is then micronized to provide a UV-curable composition. Micronization results in a further reduction in the particle size of the wax, and may be accomplished by methods known in the art. For example, micronization may be accomplished by using a media mill. Media mills are well-known in the paints/coatings/ceramics industry, and comprise a container, grinding media such as ceramic balls, steel shot or glass beads, and a means of agitation. The container may be in the vertical position (known as a sand mill or attritor mill) or in the horizontal position (known as a ball mill, JOHNS MILL, or MOLINEX MILL), and may be operated in a batch or continuous mode. The container is typically from 60–95% full of the grinding media. FIG. 3 illustrates a typical continuous flow, vertical media mill.

The pre-grind media is put into the container of the media mill and agitated. Agitation causes the grinding media to impact and collide with the wax particles, thus causing micronization of the wax particles. Agitation may be accomplished by rotating the container itself, or rotating a shaft inside the stationary container wherein the shaft has attached thereto either discs (round, flat plates) or pins (short cylindrical arms). Cooling of the grinding chamber is required during the operation of the mill to ensure that the wax particles do not dissolve and go back into solution. Agitation results in micronization of the wax to a particle size of less than about ten microns, and preferably less than about eight microns, and more preferably from about one micron to about five microns. The pre-grind media may be passed through more than one more than one time to achieve the desired particle size.

Micronization results in the production of a UV-curable composition comprising a dispersion of wax particles in at least one radiation-polymerizable compound. The resulting composition is more viscous than the pre-grind composition due to the increased surface area of the finer wax. The composition has a creamy, smooth texture and remains flowable.

The present invention further provides UV-curable compositions comprising a dispersion of wax particles in at least one radiation-polymerizable compound. In a preferred embodiment, the wax particles have a particle size of less than about ten microns, and preferably less than about eight microns, and more preferably from about one micron to about five microns. The compositions have a very smooth, creamy texture, are flowable despite high viscosity, and are stable at room temperature for at least two months.

The wax in the present compositions may be a synthetic or natural wax. Synthetic waxes include, for example, polyethylene (PE), oxidized polyethylene, polypropylene, Fischer-Tropsch (FT) waxes, ethylene bis-stearamide (EBS), and erucamide. Natural waxes include candelila, carnauba, montan, and petroleum waxes such as the paraffins and the microcrystalline waxes. The waxes are well-known and commercially available. The compositions may contain more than one wax. In a preferred embodiment of the present invention, the wax is carnauba, PE, oxidized PE, EBS or FT wax, or combinations thereof. Preferred combinations include PE and EBS, and oxidized PE and FT wax.

The radiation-polymerizable compounds of the present compositions may be reactive monomers or oligomers. Monomers include mono-, di- and poly-functional acrylates such as polypropylene glycol monomethacrylate, tripropylene glycol diacrylate (TRPGDA), 1,6-hexandiol diacrylate, and triethylene glycol diacrylate. A preferred monomer is TRPGDA. Oligomers include epoxy acrylates and methacrylates, urethane acrylates and methacrylates, polyester acrylates and methacrylates, acrylic acrylates and methacrylates, and cycloaliphatic epoxies. The monomer or oligomer functions as a carrier in the present compositions and finished products. If a monomer is used as the carrier, an oligomer may be added to increase the viscosity of the composition. In the final application to the substrate, the monomer and oligomer fiction as the cross-linking medium during curing. The monomers and oligomers are well-known in the art and commercially available.

The UV-curable compositions of the present invention may also contain one or more inhibitors of polymerization. The inhibitors of polymerization function to prevent premature cross-linking of the monomers and oligomers, for example during processing and transportation. Inhibitors of polymerization are well-known to those of ordinary skill in the art and include, for example, quinones such as hydroquinone and methyl hydroquinone (MEHQ), aromatic ketones such as benzophenone and phenyl benzophenone, acetophenones such as 2,2-diethoxy acetophenone, 1-hydroxy cyclohexyl acetophenone, and benzoins such as benzoin ethers. A preferred inhibitor is MEHQ.

The UV-curable compositions of the present invention preferably contain at least about 5% by weight of the wax or waxes, at least about 0.01% of the inhibitor or inhibitors, and at least about 49% of the radiation-polymerizable compound, which may be a monomer, oligomer, or mixture thereof. In a preferred embodiment, the composition contains from about 5% to about 50% of wax, from about 0.02% to about 0.10% of inhibitor, and from about 49.9% to about 94.98% of radiation-polymerizable compound. The compositions may comprise further optional components appropriate for the particular technical application for which the composition is intended to be used. Conventional optional components include, for example, fillers, pigments, dyes and additives such as viscosity modifying agents, flow agents, wetting agents, and slip agents.

The present compositions are useful in a method of coating a substrate. The present invention provides a method for coating a substrate comprising adding a UV-curable composition to a coating to provide a UV-curable coating, wherein the UV-curable composition comprises a dispersion of wax particles in at least one radiation-polymerizable compound; applying the UV-curable coating to a substrate; and exposing the substrate to ultraviolet radiation for a time sufficient to form a cured coating. The UV-curable coating preferably contains from about 2% to about 20% of the UV-curable composition. Suitable substrates include any substrate that can be coated by the UV-curable compositions of the present invention, such as, for example, glass, metal, plastic such as polyethylene, paper, cardboard, wood, textiles and copolymers. Flexible substrates such as paper, polyethylene fibers and cardboard are preferred substrates. Ultraviolet radiation may be applied to the coated substrate by methods known in the art, for example by using mercury vapor UV lamps, UV-flash lamps, pulsed xenon lamps, or electrode-less lamps. Such lamps are known in the art and commercially available.

The UV-curable compositions of the present invention are useful in the production of coatings, paints, varnishes and inks. The present invention provides a coating, paint, varnish or ink comprising a UV-curable composition wherein the composition comprises a dispersion of wax particles in a radiation-polymerizable compound, and manufactured articles formed using the coatings, paints, varnishes and inks of the invention. In a preferred embodiment, the coating, paint, varnish or ink contains from about 2% to about 20% of the UV-curable composition. Clear coatings comprising the UV-curable compositions of the present invention are particularly preferred. Manufactured articles containing flexible substrates such as paper, polyethylene fibers and cardboard, when coated by clear coatings comprising the UV-curable compositions of the present invention, exhibit higher gloss retention, better clarity retention, improved appearance, increased hardness and better abrasion resistance as compared to products made from traditionally dispersed mixtures.

The invention is further illustrated by the following examples which are not intended in any way limit the scope of the invention.

EXAMPLE 1

Forty to seventy pound samples of compositions containing one or more waxes, a UV-polymerizable monomer, and a polymerization inhibitor as detailed in Table 1 below were prepared as follows. All percentages in Table 1 are by weight.

TABLE 1

Formulations and Particle Sizes of Some Pilot Plant Samples

| Sample No. | Wax | Inhibitor | Monomer | Dissolution Temp (° F.) | Wax Particle Size ($\mu$m) |
|---|---|---|---|---|---|
| 1 | 25% Carnauba | 0.02% MEHQ | 74.98% TRPGDA | 200–210 | 2 (spherical) |
| 2 | 25% Oxidized PE | 0.02% MEHQ | 74.98% TRPGDA | 230–240 | 2 (spherical) |
| 3 | 28% PE; 12% EBS | 0.02% MEHQ | 59.98% TRPGDA | 260–270 | 7 to 8 (rice) |
| 4 | 14% PE; 6% EBS | 0.02% MEHQ | 79.98% TRPGDA | 260–270 | 7 to 8 (rice) |
| 5 | 11% Oxidized PE (A)[1]; 8% Oxidized PE (B)[2]; 1% FT Wax | 0.02% MEHQ | 79.98% TRPGDA | 240–250 | 7 to 8 (spherical) |

[1] low molecular weight maleated PE
[2] higher molecular weight oxidized PE

Each of the five compositions in Table 1 was prepared as follows. A batch of from forty to seventy pounds of wax, monomer and inhibitor was loaded into a ten-gallon jacketed kettle containing an air-driven stirrer. Each batch was heated to the dissolution temperature indicated in Table 1 using a Neslab Exacal High Temperature Bath (Neslab Instruments, Inc. Portsmouth, N.H. 03801) for temperatures above 250° F., or a Neslab SWHX Sea-Water Heat Exchanger with two 5000W heating rods, using Dow Syltherm 800 Heat Transfer Liquid (Dow Chemical Corp. Midland, Mich. 48674) as the heating fluid. The batch was heated at the indicated temperature until complete dissolution to provide a pre-grind mixture, and then passed through a scraped-surface heat exchanger (VOTATOR, Model L, Serial #190, Girdler Corp., Louisville, Ky.) cooled with a 50/50 propylene glycol mix pumped through the VOTATOR using a Neslab HX-75 Coolflow refrigerated circulator. In samples 3 and 4, EBS was used as a cosolvent to facilitate dissolution of PE, which was otherwise insoluble in TRPGDA.

The pre-grind mixture for Sample 1 was cooled to temperatures between 70° F. and 90° F., while the pre-grind mixture for the remaining samples was cooled to temperatures between 85° F. and 110° F. The flowrate of the discharged product was in the range of 15 to 20 gallons per hour.

The pre-grind mixture was then passed through a vertical media mill (REDHEAD, Model No. L-5-P, CB Mills, Buffalo Grove, Ill.) at a rate of 10 to 15 gallons per hour. The media used was spherical zirconium-silicate ceramic beads of particle size 1.2 to 1.6 mm in diameter at a loading volume of from 65% to 80% of the open chamber volume. Two passes through the media mill were required to achieve the desired particle size. The compositions of finished product concentrate were very creamy, smooth and flowable.

The compositions were examined through a microscope at 312x magnification to determine particle size and shape. The size of the wax particles averaged from 2 to 8 microns and is indicated in Table 1. In compositions in which EBS was used as a cosolvent to facilitate dissolution of PE, the wax particles were rice-shaped. In all other compositions, the wax particles were roughly spherical.

The compositions were added to coatings to provide a final concentration of 2% to 20% of the composition in the final coating formulation. The final coating formulations were applied to substrates and cured. Samples were prepared by mixing from 2% to 12% by weight of the UV monomer compositions in Table 1 into Auracure 14-97M, an acrylic based overprint coating manufactured by Aurachem, Harrison, N.J. 07029. The coating was drawn down using a wire rod for wet film applications. Wire rods #6, #8, #16 manufactured by Paul N. Gardner Pompano Beach, Fla. 33060 were used. The wet film thicknesses corresponding to these rods were 15.2 $\mu$m, 20.3 $\mu$m and 40.6 $\mu$m. The substrate material was Leneta Chart Form 7B manufactured by Leneta, Mahwah, N.J. 07430. After the film was drawn onto the substrate, the substrate was passed through a Fusion UV System F300, LC-6 Benchtop Conveyor with a H+ Bulb source (320 to 380 nm) manufactured by Fusion Systems Corp. of Rockville, Md. 20855 and cured at a rate of 100 ft/min. The exposure time to the UV source was on the order of 2 to 10 milliseconds.

The properties of the cured coatings were observed and compared to a standard substrate coated with only Auracure 13-97M to the appropriate thickness. The coating from sample 1 exhibited scuff resistance. The coating from sample 2 exhibited reduced slip. The coatings from samples 3 and 4 produced a matte finish on the substrate and thus exhibited reduced gloss.

The compositions prepared from sample 5 contain three waxes that imparted three properties to the final cured coating. The higher molecular weight oxidized PE (A) provided heat resistance in the final application, and the lower molecular weight oxidized PE (B) provided slip properties to the finished coat. The FT wax imparted hardness to the finished coat.

We claim:

1. A method for making an ultraviolet radiation-curable composition comprising the steps of:
   (a) mixing at least one wax, at least one radiation-polymerizable compound, and at least one inhibitor of polymerization;
   (b) dissolving said at least one wax in said at least one radiation-polymerizable compound by heating to provide a mixture of radiation-polymerizable compound, wax and inhibitor; wherein said heating step is at a temperature that is insufficient to activate polymerization of said radiation-polymerizable compound;
   (c) cooling said mixture to provide a dispersion of wax particles in said radiation-polymerizable compound; and
   (d) micronizing the dispersion to provide an ultraviolet radiation-curable composition.

2. The method of claim 1 wherein said wax is polyethylene, oxidized polyethylene, polypropylene, a Fischer-Tropsch wax, ethylene bis-stearamide, erucamide, candelila, carnauba, montan, or a petroleum wax.

3. The method of claim 1 wherein said wax is carnauba, polyethylene, oxidized polyethylene, ethylene bis-stearamide or a Fischer-Tropsch wax.

4. The method of claim 1 wherein said radiation-polymerizable compound is a reactive monomer or oligomer.

5. The method of claim 4 wherein said reactive monomer is a monofunctional acrylate, a difunctional acrylate, or a polyfunctional acrylate.

6. The method of claim 4 wherein said reactive monomer is polypropylene glycol monomethacrylate, tripropylene glycol diacrylate, 1,6-hexandiol diacrylate, or triethylene glycol diacrylate.

7. The method of claim 4 wherein said reactive monomer is tripropylene glycol diacrylate.

8. The method of claim 1 wherein said inhibitor of polymerization is a quinone, an aromatic ketone, an acetophenone or a benzoin.

9. The method of claim 1 wherein said inhibitor of polymerization is hydroquinone, methyl hydroquinone, benzophenone, phenyl benzophenone, 2,2-diethoxy acetophenone, 1-hydroxy cyclohexyl acetophenone, or benzoin ether.

10. The method of claim 9 wherein said inhibitor of polymerization is methyl hydroquinone or hydroquinone.

11. The method of claim 1 wherein said at least one wax, said at least one radiation-polymerizable compound, and said at least one inhibitor of polymerization are mixed in amounts of at least about 5% of said wax, at least about 0.01% of said inhibitor, and at least about 49% of said radiation-polymerizable compound.

12. The method of claim 1, wherein said at least one wax, said at least one radiation-polymerizable compound, and said at least one inhibitor of polymerization are mixed in amounts of from about 5% to about 50% of said wax, from about 0.02% to about 0.1% of said inhibitor, and from about 49.9% to about 94.98% of said radiation-polymerizable compound.

13. The method of claim 1 wherein said heating is at a temperature of from about 170° F. to about 270° F.

14. The method of claim 1 wherein said cooling is by pumping the mixture through a scraped-surface heat exchanger.

15. The method of claim 1 wherein said micronization is by agitation in a media mill.

16. The method of claim 1 wherein said ultraviolet radiation-curable composition contains wax particles having a particle size of less than about ten microns.

17. The method of claim 1 wherein said ultraviolet radiation-curable composition contains wax particles having a particle size of from about two microns to about eight microns.

18. An ultraviolet radiation curable-composition comprising a dispersion of wax particles in at least one radiation-polymerizable compound and at least one inhibitor of polymerization; wherein said wax particles comprise a wax and said radiation-polymerizable compound, and wherein said ultraviolet curable-composition is stable at room temperature for at least two months.

19. The composition of claim 18 wherein said wax is polyethylene, oxidized polyethylene, polypropylene, a Fischer-Tropsch wax, ethylene bis-stearamide, erucamide, candelila, carnauba, montan, or a petroleum wax.

20. The composition of claim 18 wherein said wax is carnauba, polyethylene, oxidized polyethylene, ethylene bis-stearamide or a Fischer-Tropsch wax.

21. The composition of claim 18 wherein said radiation-polymerizable compound is a reactive monomer.

22. The composition of claim 21 wherein said reactive monomer is a monofunctional acrylate, a difunctional acrylate, or a polyfunctional acrylate.

23. The composition of claim 21 wherein said reactive monomer is polypropylene glycol monomethacrylate, tripropylene glycol diacrylate, 1,6-hexandiol diacrylate, or triethylene glycol diacrylate.

24. The composition of claim 21 wherein said reactive monomer is tripropylene glycol diacrylate.

25. The composition of claim 18 wherein said inhibitor of polymerization is a quinone, an aromatic ketone, an acetophenone or a benzoin.

26. The composition of claim 18 wherein said inhibitor of polymerization is hydroquinone, methyl hydroquinone, benzophenone, phenyl benzophenone, 2,2-diethoxy acetophenone, 1-hydroxy cyclohexyl acetophenone, or benzoin ether.

27. The composition of claim 18 wherein said inhibitor of polymerization is methyl hydroquinone.

28. The composition of claim 18 comprising at least about 5% of said wax, at least about 0.2% of said inhibitor, and at least about 49% of said radiation-polymerizable compound.

29. The composition obtained according to the method of claim 1, wherein said composition comprises: from about 5% to about 50% of said wax in particulate form, from about 0.02% to about 0.1% of said inhibitor, and from about 49.9% to about 94.98% of said radiation-polymerizable compound, wherein said wax in particulate form also comprises said radiation-polymerizable compound, and wherein said ultraviolet curable-composition is stable at room temperature for at least two months.

30. A method for coating a substrate comprising the steps of:
   (a) adding the ultraviolet radiation-curable composition of claim 18 to a coating to provide an ultraviolet radiation-curable coating;
   (b) applying said UV-curable coating to a substrate to provide a coated substrate; and
   (c) exposing said coated substrate to ultraviolet radiation for a time sufficient to form a cured coating.

31. The method of claim 30 wherein said substrate is glass, metal, plastic, paper, cardboard, wood, textile or a copolymer.

32. The method of claim 30 wherein said substrate is paper, polyethylene fiber or cardboard.

33. A coating, paint, varnish or ink comprising the ultraviolet radiation-curable composition of claim 18.

34. A coating, paint, varnish or ink comprising from about 2% to about 20% of the ultraviolet radiation-curable composition of claim 18.

35. A manufactured article formed using the coating, paint, varnish or ink of claim 33.

* * * * *